United States Patent [19]

Exelby

[11] Patent Number: 4,465,467
[45] Date of Patent: Aug. 14, 1984

[54] EDUCATIONAL DEVICE FOR TEACHING CHILDREN TO READ

[76] Inventor: Nicholas Exelby, 13 Victoria Rd., Burgess Hill, Sussex RH 15 9QS, England

[21] Appl. No.: 380,670
[22] PCT Filed: Sep. 8, 1981
[86] PCT No.: PCT/GB81/00184
§ 371 Date: May 4, 1982
§ 102(e) Date: May 4, 1982
[87] PCT Pub. No.: WO82/00828
PCT Pub. Date: Mar. 18, 1982

[30] Foreign Application Priority Data
Sep. 10, 1980 [GB] United Kingdom ............. 8029266

[51] Int. Cl.³ ............................................. G09B 17/00
[52] U.S. Cl. ..................................... 434/172; 273/155
[58] Field of Search ................... 434/172, 167, 159; 273/155

[56] References Cited

U.S. PATENT DOCUMENTS

| | | | |
|---|---|---|---|
| 1,841,369 | 1/1932 | Freeman | 434/159 |
| 2,491,164 | 12/1949 | Dirckx | 434/172 |
| 3,389,914 | 6/1968 | Solomita et al. | 273/155 |
| 3,744,154 | 7/1973 | Pott | 434/167 |
| 3,811,682 | 5/1974 | Neale et al. | 273/155 |
| 3,892,411 | 7/1975 | High | 273/155 |

FOREIGN PATENT DOCUMENTS

| | | | |
|---|---|---|---|
| 526028 | 2/1954 | Belgium | 273/155 |
| 1421455 | 1/1976 | United Kingdom | 434/172 |
| 1536616 | 12/1978 | United Kingdom | 273/155 |

*Primary Examiner*—William H. Grieb
*Attorney, Agent, or Firm*—Berman, Aisenberg & Platt

[57] ABSTRACT

The invention relates to an educational device adapted to permit the rapid and simple assembly, disassembly and reassembly of letters, words or figures to facilitate reading. It comprises a planar area (10) of thick paper, cardboard, synthetic plastics or other material which is divided into a number of squares, oblongs or other discrete sub-areas of a desired shape (12 ... 28) by dividing lines or gaps so that at least some of the discrete sub-areas can be folded over as flaps to cover part of a central area (18, 20, 22) of the planar area, there being letters, words or figures applied to both the front and back surfaces of the planar area, the planar area having corner flaps.

5 Claims, 12 Drawing Figures

EDUCATIONAL DEVICE FOR TEACHING CHILDREN TO READ

This invention relates to an educational device adapted to permit the rapid and simple assembly, disassembly and reassembly of letters, words and figures. It is especially useful as an elementary reading aid.

British Pat. No. 1,536,616 in the name of C. E. High describes puzzle apparatus comprising a substantially square base playing area onto which can be folded strip members which are hinged to the four sides of the square. These strip members are of varied shape and have coloured portions formed on them.

The present invention departs from High's device in that it is concerned with an educational device (primarily for use in teaching elementary reading) and not with a puzzle, and has hinged flaps on which letters, words or figures are printed or otherwise formed. Further, the present invention makes use of the flaps in their unfolded state and not only when they are folded over as in High's device. Yet another distinction is that the present invention makes use of corner flaps which are entirely absent in High's device.

According to the invention, an educational device for the purpose indicated above comprises a planar area of thick paper, cardboard, synthetic plastics or other material which is divided into a number of squares, oblongs or other discrete sub-areas of a desired shape by dividing lines or gaps so that at least some of the discrete sub-areas can be folded over as flaps to cover part of a central area of the planar area, characterized in that letters, words or figures are printed or carried on both the front and back surfaces of the planar area and that the planar area includes corner flaps.

Preferably more than one colour is used for each letter, word or figure printed or carried on the front and back surfaces of the planar sheet, and different colours are used for the different letters, words or figures on the planar sheet.

In one form of device in accordance with the invention the above-mentioned flaps fold inwards to cover part of the central area and fold outwards to uncover part of the central area. The letters, words or figures applied to the back of the planar area are upside down in relation to the letters, words or figures applied to the front surface of the planar area. It thus follows that, by simply folding the flaps inwards or outwards, individual letters, words or figures on the back surface can be revealed and changed with each other and with those on the front surface.

Among the advantages of the invention are the following:

(1) Any combination of letters, words or figures can be shown as being made of, and from, its elementary parts.

(2) Many combinations of letters, words or figures can be formed in a very short time.

(3) The viewer can be reassured of the elementary parts of any combination—quickly, repeatedly, clearly and without effort.

Some examples of educational devices in accordance with the invention are shown in the accompanying drawings, in which.

The educational device shown in FIGS. 1-8 comprises a single planar sheet 10 of thick paper, cardboard, synthetic plastics or other material (which, in certain cases, can be transparent) divided into a number of squares or oblongs 12, 14, 16, 18, 20, 22, 24, 26 and 28. cuts 30, 32, 34 and 36 are formed along some of the dividing lines so that all the squares or oblongs except the centre one 20 form flaps which can be folded inwards or outwards about one or other of the dividing lines.

Figure 1:
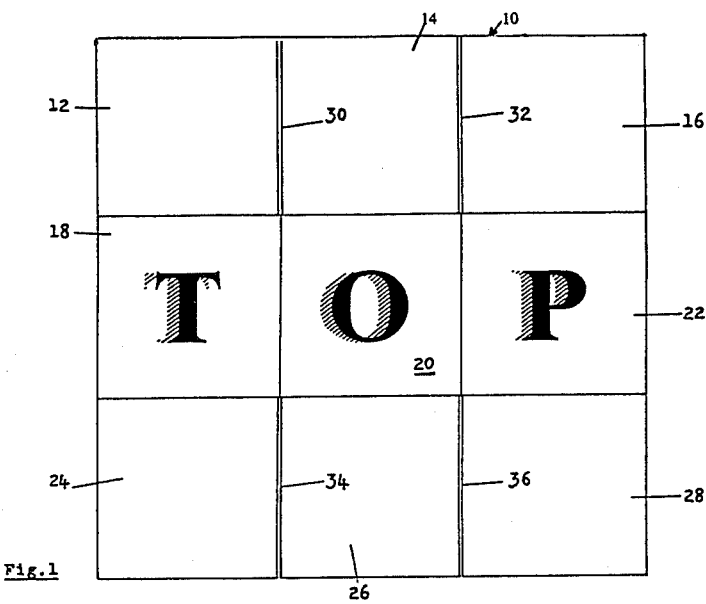
FIG. 1 is a top plan view of one form of device in its flat state.
Figure 2:
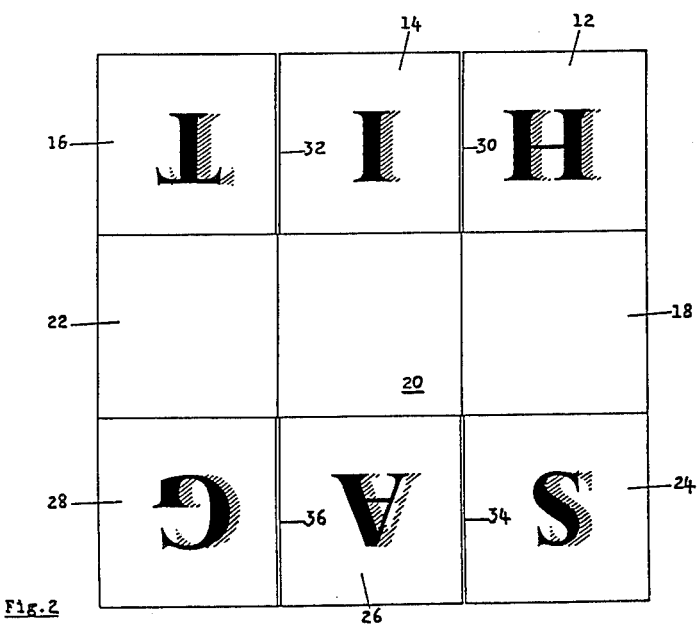
FIG. 2 is an underneath plan view of the device shown in FIG. 1.
Figure 3:
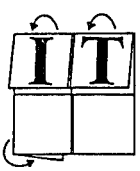
FIGS. 3-8 are further top plan views of the device, FIGS. 3-7 showing different flaps folded over.
Figure 4:
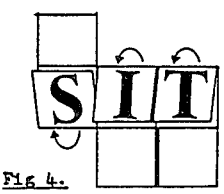
Figure 5:
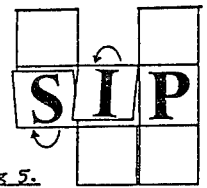
Figure 6:
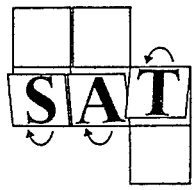
Figure 7:
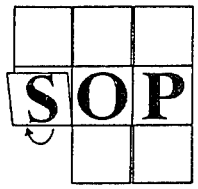
Figure 8:
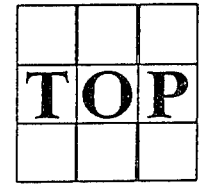

As will be seen from FIG. 1, the letters T, O and P have been printed on the front surface of each of the squares or oblongs 18, 20 and 22 respectively, while the front surfaces of the other squares or oblongs are blank. FIG. 2 shows, however, that the letters H, I and T have been printed upside down (in relation to the letters T, O and P on the front surface of the sheet 10) on the rear surface of each of the squares or oblongs 12, 14 and 16 respectively. Likewise, the letters S, A and G have been printed upside down on the rear surface of each of the squares or oblongs 24, 26 and 28 respectively. The rear surfaces of the squares or oblongs 18, 20 and 22 are blank.

Each of the letters is printed in two colours, i.e., one colour in bold print and the other colour in shadow. Preferably the shadow colour is yellow, white, silver, gold or some other bright colour. Further, more than one colour is used for the different letters. Thus, for example, the letters T, O and P could be green with yellow shadow, the letters H, I and T could be red with yellow shadow, and the letters S, A and G could be blue with yellow shadow.

Figure 9:
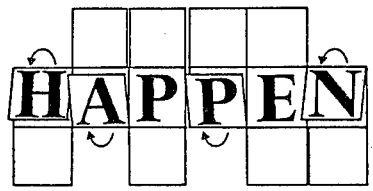
FIGS. 9-10 are top plan views of two devices shown in FIGS. 1-8 in use together.
Figure 10:
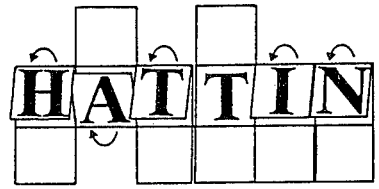

FIGS. 3-8 show how the device shown in FIGS. 1 and 2 is used. By folding different flaps of the device inwards or outwards, different combinations of letters can be obtained to form different words. FIGS. 9-10 further show how two such devices can be used together to form longer words. By folding and unfolding the sheet or sheets 10 over a period of time each day, a child will soon learn to read the words produced on the sheet.

Figure 11:
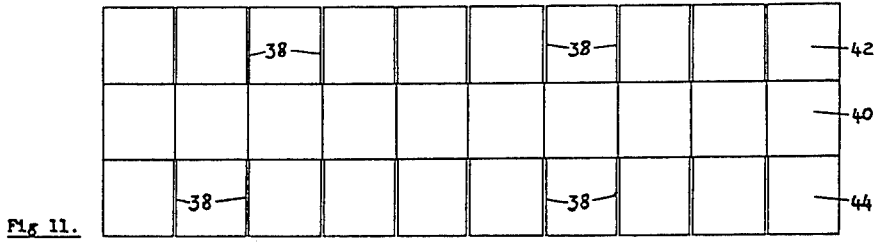
FIGS. 11 and 12 are top plan views of two further forms of device.

It will be understood that the number of squares or oblongs into which the sheet 10 is divided can be greatly varied. Normally the number of squares or oblongs will be between 6 and 30 inclusive, a 30-square sheet being shown by way of example in FIG. 11. Cuts 38 are provided along some of the dividing lines to permit different squares to be folded inwards or outwards in the manner of flaps in the same way as in FIGS. 1-8. The ten squares forming the middle row 40 of squares each have a letter printed on their front surfaces, while the upper and lower rows 42 and 44 have a letter printed upside down on the rear surface of each square.

Figure 12:
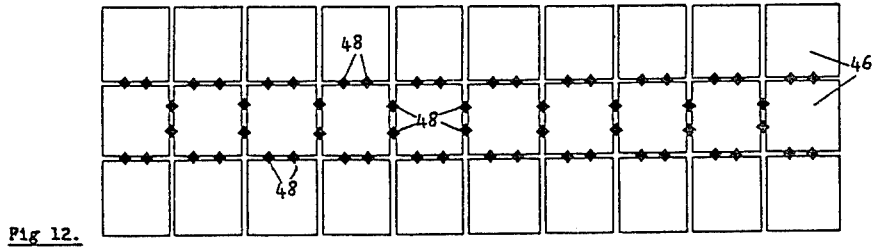

It is not essential that the device be formed from a single sheet. FIG. 12 shows a device comprising a number of individual panels or cards 46 which are hinged together by hinge members 48 to form a composite sheet similar to that shown in FIG. 11.

I claim:

1. An educational device for teaching children to read, said device comprising:

(a) a planar area of sheet material having corner zones;

(b) dividing lines crossing each other at right angles and serving to divide said planar area into a plurality of discrete rectangular sub-areas, at least one of said sub-areas forming a rectangular central area bounded along edges thereof by rectangular sub-areas adapted to be folded over as flaps to cover at least part of the said central area, and at least some of said dividing lines being in the form of cuts to allow any selected one of said flaps to be folded over without displacing a flap adjacent to it; and (c) printed reading matter comprising letters of the alphabet on both the front and back surfaces of the planar area, but on only one side of each sub-area, each letter of said reading matter being printed in at least two contrasting colours;

said sub-areas including at least four corner flaps at the corner zones of said planar area.

2. A device according to claim 1, wherein different colours are used for different letters on the planar sheet.

3. A device according to claim 1, wherein one colour of each letter is in bold print while the other colour of each letter is in shadow.

4. A device according to claim 3, wherein the shadow colour is a light colour.

5. A device according to claim 3, wherein the shadow colour is selected from the group consisting of yellow, white, silver and gold.

* * * * *